United States Patent
Wang et al.

(10) Patent No.: US 7,719,611 B2
(45) Date of Patent: May 18, 2010

(54) HANDHELD ELECTRONIC DEVICE WITH IMAGE-CAPTURING APPARATUS EXPOSED THROUGH WINDOW

(75) Inventors: John C. Wang, Taoyuan County (TW); Mickey Mii, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 12/369,723

(22) Filed: Feb. 11, 2009

(65) Prior Publication Data

US 2009/0149216 A1 Jun. 11, 2009

Related U.S. Application Data

(63) Continuation-in-part of application No. 10/709,605, filed on May 18, 2004, now Pat. No. 7,522,212.

(30) Foreign Application Priority Data

Jan. 30, 2004 (TW) ............................. 93201366 U

(51) Int. Cl.
*H04N 5/225* (2006.01)
(52) U.S. Cl. .................................... 348/373; 455/575.1
(58) Field of Classification Search ................. 348/373, 348/375, 552, 14.02, 374; 455/575.3, 575.1
See application file for complete search history.

(56) References Cited

U.S. PATENT DOCUMENTS 7,106,357 B2* 9/2006 Fukuda et al. ........... 348/14.02

| | | | |
|---|---|---|---|
| 2003/0040346 A1* | 2/2003 | Fukuda et al. | 455/575 |
| 2004/0116166 A1* | 6/2004 | Makishima | 455/575.1 |
| 2004/0192220 A1* | 9/2004 | Huang et al. | 455/74 |
| 2006/0142053 A1* | 6/2006 | Garcia et al. | 455/556.1 |

FOREIGN PATENT DOCUMENTS

JP 2003152848 A * 5/2003

OTHER PUBLICATIONS

Machine English Translation of JP 20040192220, May 23, 2003.*

* cited by examiner

*Primary Examiner*—Lin Ye
*Assistant Examiner*—Nelson D. Hernández Hernández
(74) *Attorney, Agent, or Firm*—Jianq Chyun IP Office

(57) ABSTRACT

A handheld electronic device mainly includes a first casing, a second casing and an image-capturing apparatus. The first casing has a first surface and a second surface. The first casing has a display screen on the first surface and a window extending through the first surface and the second surface. The second casing is pivoted to the first casing. The second casing is permitted to move over the second surface of the first casing. The image-capturing apparatus is set up on the second casing for capturing images. When the second casing is located on the second surface of the first casing, the image-capturing apparatus and the display screen both faces the same direction so that the image-capturing apparatus can capture images of a user of the handheld electronic device facing the display screen. At this position, the image-capturing apparatus is exposed to the user through the window.

2 Claims, 10 Drawing Sheets

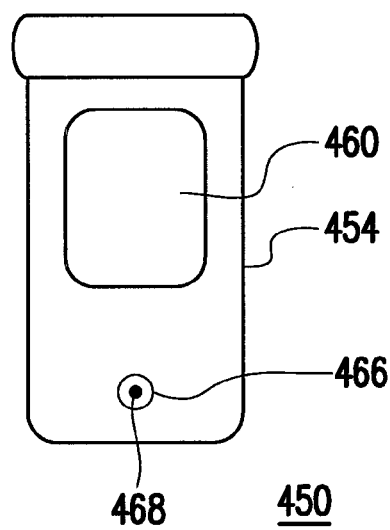
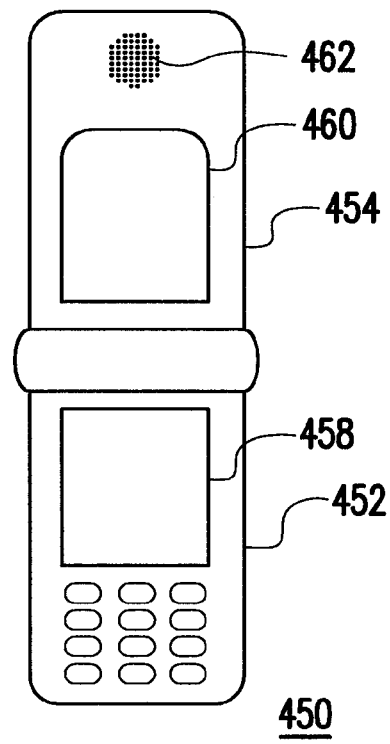
FIG. 8G  FIG. 8H
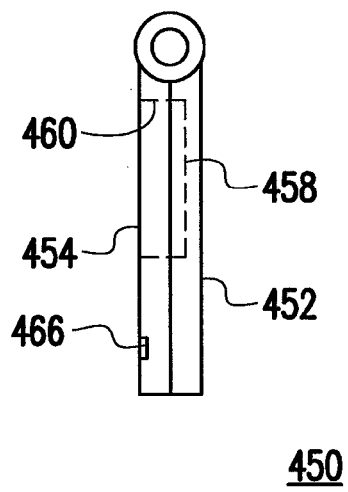
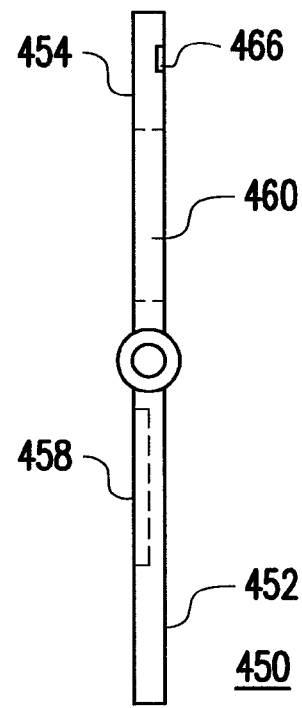
FIG. 8I  FIG. 8J

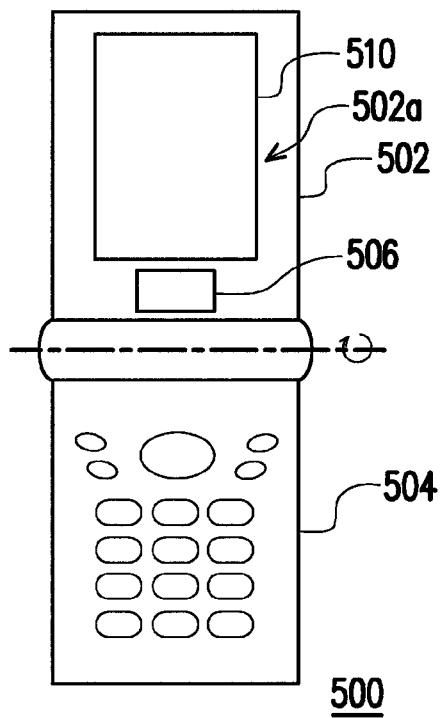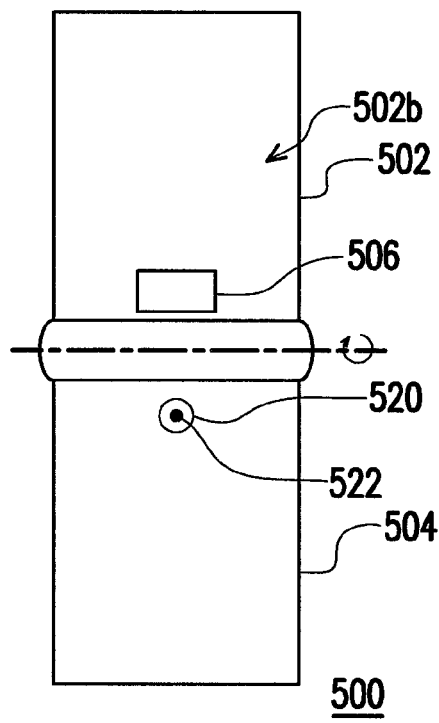
FIG. 9A    FIG. 9B
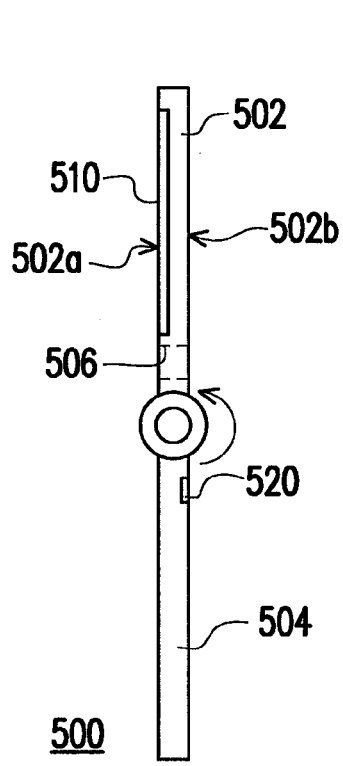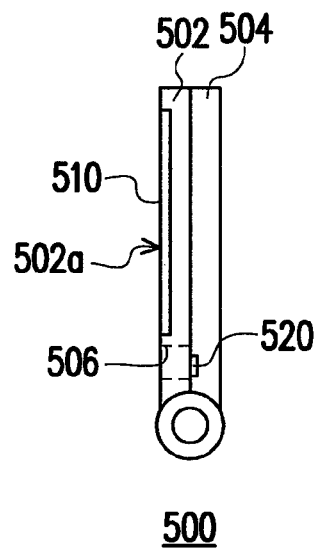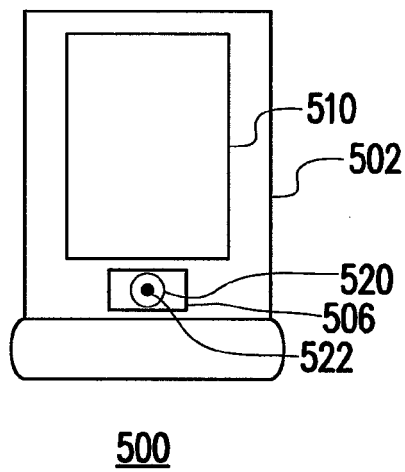
FIG. 10    FIG. 11    FIG. 12

HANDHELD ELECTRONIC DEVICE WITH IMAGE-CAPTURING APPARATUS EXPOSED THROUGH WINDOW

CROSS-REFERENCE TO RELATED APPLICATION

This application is a divisional of and claims priority benefit of an application Ser. No. 10/709,605, filed on May 18, 2004, now allowed, which claims the priority benefit of Taiwan application serial no. 93201366, filed on Jan. 30, 2004. The entirety of each of the above-mentioned patent applications is hereby incorporated by reference herein and made a part of this specification.

BACKGROUND OF THE INVENTION

1. Field of the Invention

The present invention relates to a handheld electronic device. More particularly, the present invention relates to a handheld electronic device with an image-capturing apparatus which can capture image conveniently in two opposite directions.

2. Description of the Related Art

Handheld electronic devices are compact, portable electronic products. Examples of handheld electronic devices include mobile phones, pocket personal computers (Pocket PCs) and personal digital assistants (PDAs). Because handheld electronic devices can be used for wireless communication and Internet connection, the device is a versatile and highly efficient means of processing communications. At present, handheld electronic devices have become one of the most sought-after high-tech products.

FIGS. 1A and 1B are front view and back view of a conventional mobile phone 100. As shown in FIGS. 1A and 1B, the mobile phone 100 has an image-capturing apparatus 102 capable of turning 180° around an axis 104. The image-capturing apparatus 102 is installed within a groove 112 in a top of a main body 110 of the mobile phone 100. The image-capturing apparatus 102 includes a lens 106 which can be rotated within a range of 180 degrees to take pictures of objects at different directions. When the lens 106 of the image-capturing apparatus 102 is positioned in the same direction as a display screen 120 of the mobile phone 100, an image of a user of the mobile phone 100 can be displayed on the display screen 120 of the main body 110. Thereafter, if the user presses a function key 116 on the main body 110, the image of the user can be captured by a photosensitive element (not shown) inside the image-capturing apparatus 102. When the image-capturing apparatus 102 is turned rearwards for 180° so that the lens 106 is now directed rearwards, images of objects or other persons facing the user can be displayed on the display screen 120. Thereafter, if the user presses the function key 116 on the main body 110, the images of the objects or other persons are captured by the photosensitive element (not shown) within the image-capturing apparatus 102.

U.S. Pat. No. 6,473,631 disclosed a swivel videophone whose image-capturing apparatus has a rotation shaft locatable between and pivoted to lateral beams of a main body of the videophone. Hence, the image-capturing apparatus is free to rotate to a desired direction.

The two aforementioned mobile phones each must provide a groove in a top of a main body of the mobile phone for accommodating the image-capturing apparatus. The groove extends through front and rear faces of the main body the mobile phone. The cost of molding and fabricating the main body of the mobile phone is relatively high. Moreover, it is difficult to precisely and reliably locate the lens of the image-capturing apparatus at forward and rearward directions, which are the mostly desired directions in use. In addition, the image-capturing apparatus undermines the visual feeling of integrity of the mobile phone since the image-capturing apparatus looks like an addition component attached to the mobile phone.

U.S. Pat. No. 5,491,507 shows an image-capturing apparatus pivoted to one side of a main body of a mobile videophone so that an image of an object can be captured by turning the image-capturing apparatus to a desired aspect pointing toward the object. The image-capturing apparatus gives a user of the mobile videophone a visual feeling of being not integral and compact. Furthermore, it is not convenient to set the image-capturing apparatus fixed at a specific direction.

SUMMARY OF THE INVENTION

Accordingly, the present invention is directed to a handheld electronic device with an image-capturing apparatus, which can flip between forward and rearward-facing directions so that the handheld electronic device can be used to capture images of a user thereof and other persons and objects. Moreover, the image-capturing apparatus gives the handheld electronic device an integral and compact visual effectiveness.

To achieve these and other advantages and in accordance with the purposes of the invention, as embodied and broadly described herein, the invention provides a handheld electronic device including a first casing and a second casing. A display screen and an image-capturing apparatus are set up on the first casing and the second casing respectively. Furthermore, the display screen is positioned on a front surface of the first casing and the second casing is pivoted to a rear surface of the first casing. The image-capturing apparatus for capturing images is positioned at a distance away from a hinge joint between the first casing and the second casing. The second casing is permitted to flip relative to the first casing so that the second casing can move between first and second positions, wherein at the first position, the second casing is received in the rear surface of the first casing, and at the second position, the second casing extends away from the rear surface of the first casing.

In accordance with an alternative embodiment, the handheld electronic device mainly comprises a first casing, a second casing and an image-capturing apparatus. The first casing has a display screen and the second casing is pivoted to the first casing. The second casing has an inner surface and an outer surface. The second casing has a window extending through the inner surface and the outer surface. In addition, the image-capturing apparatus is set up on the outer surface of the second casing for capturing images. The second casing is permitted to fold over the first casing so that the image-capturing apparatus and the display screen both face the same direction and the display screen is exposed through the window.

The present invention also provides another alternative handheld electronic device design. The handheld electronic device mainly comprises a first casing, a second casing and an image-capturing apparatus. The first casing has a first surface and a second surface. The first casing has a display screen on the first surface and a window extending through the first surface and the second surface. The second casing is pivoted to the first casing. The second casing is permitted to move over the second surface of the first casing. The image-capturing apparatus is set up on the second casing for capturing images. When the second casing is located on the second surface of the first casing, the image-capturing apparatus and the display screen both faces the same direction so that the image-capturing apparatus can capture images of a user of the handheld electronic device facing the display screen. At this position, the image-capturing apparatus is exposed to the user through the window.

According to the embodiments of the present invention, the image-capturing apparatus may comprise a lens and a photosensitive device. Images of objects pass through the lens and project onto the photosensitive device whereby the handheld electronic device can take pictures of these objects and store them in a memory of the device. The photosensitive device can be a complementary metal-oxide-semiconductor (CMOS) or a charge-coupled device (CCD), for example.

In the present invention, a flippable/foldable image-capturing apparatus is deployed so that images coming from front and rear directions can pass through the lens and project onto the photosensitive device. Therefore, a user holding the handheld electronic device can easily capture an image of himself (herself) or an image of other people or object facing the user. Furthermore, the image-capturing apparatus is set up on the second casing, which is visually an integral part of the first casing. Therefore, the handheld electronic device of the present invention does not have an awkward appearance. Finally, since the image-capturing apparatus is not confined to rotate within the space of a groove, the handheld electronic device is easier to operate.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 8G and 8H are front views showing the closed and opened configurations of the handheld electronic device according to the fourth embodiment of the present invention.

FIGS. 8I and 8J are side views of FIGS. 8I and 8J, respectively.

FIGS. 9A and 9B are front and back views of a handheld electronic device according to a fifth embodiment of the present invention in an opened configuration.

FIG. 10 is a side view of FIG. 9A.

FIG. 11 is a view similar to FIG. 10, with the handheld electronic device at a closed configuration, and FIG. 12 is front view of FIG. 11.

DESCRIPTION OF THE PREFERRED EMBODIMENTS

Figure 1A:
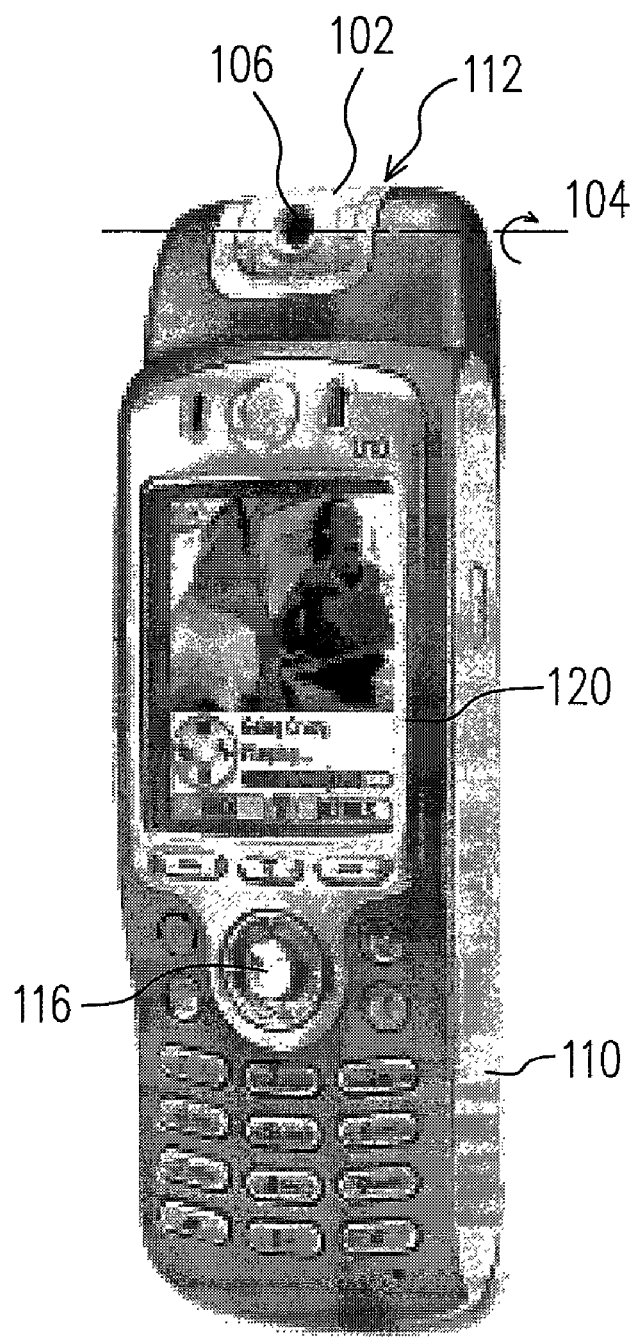
FIGS. 1A and 1B are front view and rear view of a conventional mobile phone.
Figure 1B:

Reference will now be made in detail to the present embodiments of the invention, examples of which are illustrated in the accompanying drawings. Wherever possible, the same reference numbers are used in the drawings and the description to refer to the same or like parts.

Figure 2A:
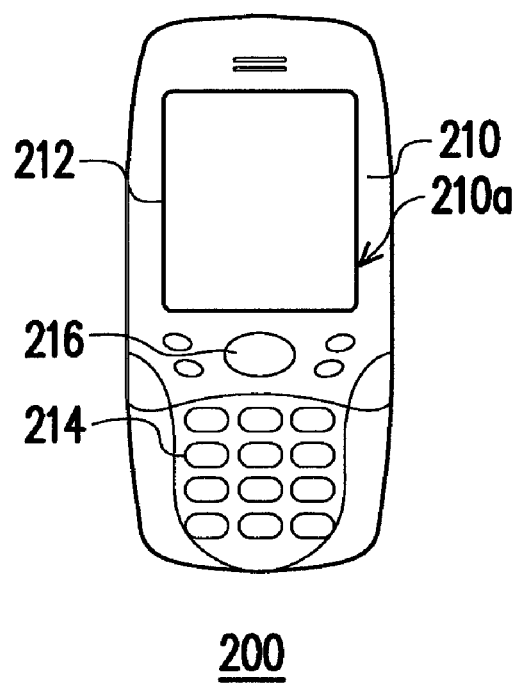
FIGS. 2A and 2B are front view and rear view of a handheld electronic device according to a first embodiment of the present invention.
Figure 2B:
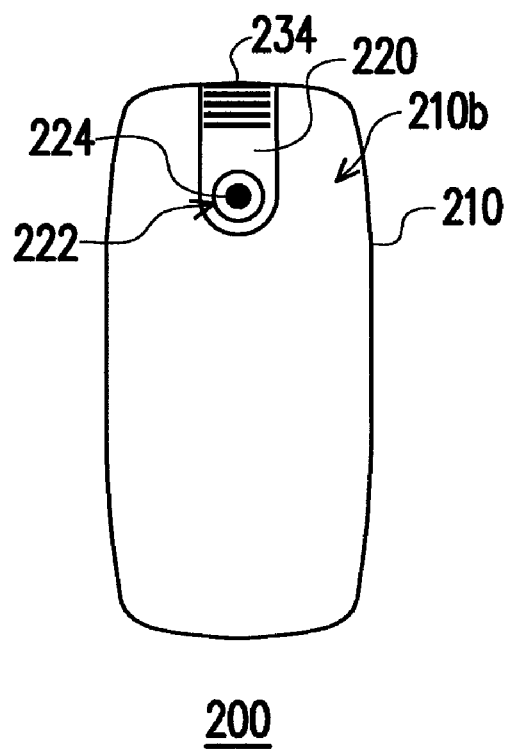

FIGS. 2A and 2B are front and back views of a handheld electronic device 200 according to a first embodiment of the present invention. As shown in FIGS. 2A and 2B, the handheld electronic device 200 mainly comprises a first casing 210 and a second casing 220. The first casing 210 has a display screen 212 mounted on a front surface 210a thereof, and the second casing 220 has an image-capturing apparatus 222. The first casing 210 is a palm-size body that houses all major electronic components of the handheld electronic device 200 therein. Aside from the display screen 212, the front surface 210a of the first casing 210 further includes a matrix of telephone keys 214 and functional keys 216 between the display screen 212 and the telephone keys 214. Furthermore, the second casing 220 is pivoted to a rear surface 210b of the first casing 210. When the image-capturing apparatus 222 is positioned in the rear surface 210b of the first casing 210, a lens 224 on the image-capturing apparatus 220 faces rearwards. At this position, images of objects behind the handheld electronic device 200 can be taken by the image-capturing apparatus 222 through the lens 224 and displayed on the display screen 212. If the user presses a predetermined one of the function keys 216 on the first casing 210, the image shown on the display screen 212 can be stored in a memory of the handheld electronic device 200.

Figure 3:
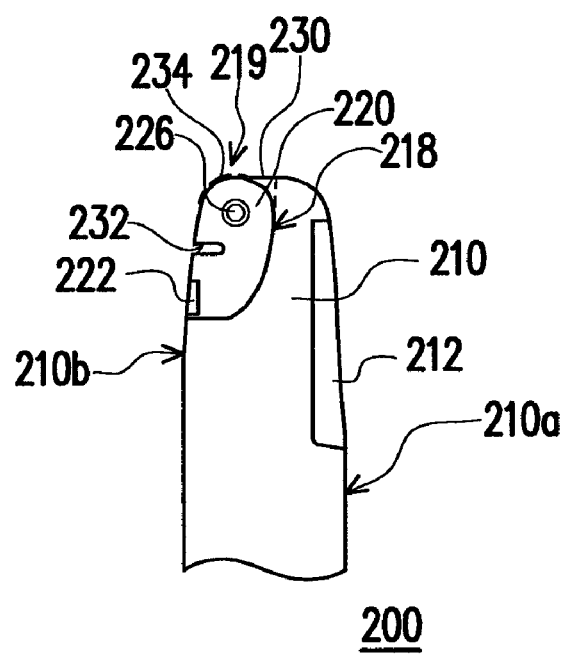
FIG. 3 is a side view of an upper portion of the handheld electronic device of the first embodiment of the present invention, wherein a second casing thereof is at a first position.

Referring to FIG. 3, the rear surface 210b of the first casing 210 comprises a hinge-accommodating groove 218 for receiving the second casing 220 therein. Furthermore, the hinge-accommodating groove 218 has an opening 219 through an upper wall of the first casing 210. Since the hinge-accommodating groove 218 does not penetrate through to the front surface 210a of the first casing 210, the handheld electronic device 200 can have an integral and compact visual feeling. Furthermore, when the second casing 210 is received in the hinge-accommodating groove 218, a surface of the second casing 210 wherein the image-capturing apparatus 222 is mounted flushes with the rear surface 210b of the first casing 210 to form a smooth profile for the handheld electronic device 200, whereby the handheld electronic device 200 is aesthetically appealing. As can be seen from FIG. 3, at this position, the hinge section 226 is located between the display screen 212 and the image-capturing apparatus 222.

Figure 4:
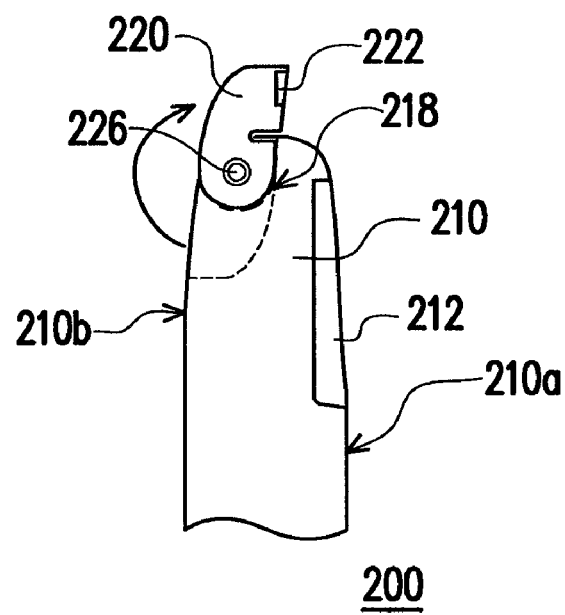
FIG. 4 is a view similar to FIG. 3, with the second casing at a second position.

FIG. 4 is a diagram showing the image-capturing apparatus 222 in FIG. 3 flipped to a forward-facing direction. The first casing 210 and the second casing 220 are joined together through a hinge section 226. The image-capturing apparatus 222 is set up at a position distant from the hinge section 226. When the second casing 220 flips up by 180° from the position of FIG. 3 to the position of FIG. 4, the second casing 220 extends through the upper opening 219, and the lens 224 of the image-capturing apparatus 222 faces the same direction as the display screen 212. The second casing 220 can flip between first and second positions, wherein at the first position, the second casing 220 is totally received in the groove 218 as shown in FIG. 3, and at the second position, the second casing 220 extends through the upper opening 219 as shown in FIG. 4. Furthermore, after flipping 180 degrees, the lens 224 of the image-capturing apparatus 222 now is located above the first casing 210 and faces a forward direction similar to the display screen 212. Hence, the display screen 212 on the first casing 210 is able to display an image of the user of the handheld electronic device 200 when he (she) faces the lens 224. Thereafter, if the user presses the predetermined one of the function keys 216 on the first casing 210, the image of the user is stored in the memory of the handheld electronic device 200.

As shown in FIGS. 3 and 4, an extension plate 230 is formed at the upper wall of the first casing 210 and extends above the opening 219. Furthermore, the second casing 220 has a corresponding slot 232. When the second casing 220 is flipped to the position above the opening 219, the extension plate 230 engages in the slot 232 so that the image-capturing apparatus 222 is reliably fixed in position. The extension plate 230 can also serve to cover a gap between the first casing 210 and the second casing 220 to improve the continuousness of the outer appearance of the handheld electronic device 200. Moreover, the outer surface of the second casing 220 is provided with serrations 234 to facilitate the user's finger to manipulate the second casing 220 to move from the first position to the second position and vice versa. When the image-capturing apparatus 222 faces a direction opposite to the display screen 212, the image-capturing apparatus 222 is located below the hinge section 226. On the other hand, when the image-capturing apparatus 222 faces the same direction as the display screen 212, the image-capturing apparatus 222 is located above the hinge section 226.

Figure 5:
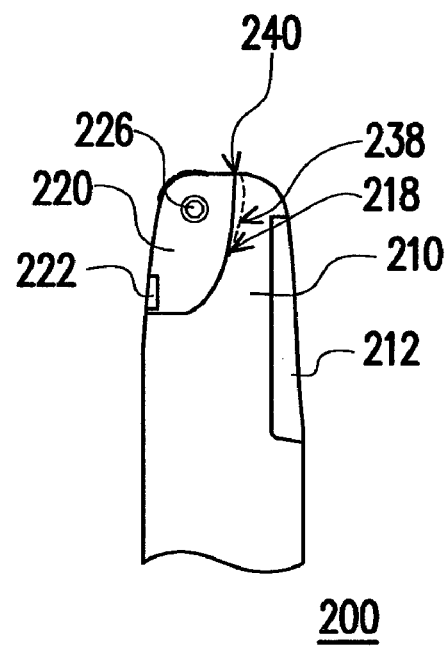
FIGS. 5 and 6 are views similar to FIGS. 3 and 4, respectively, showing a variation of the first embodiment of the present application.
Figure 6:
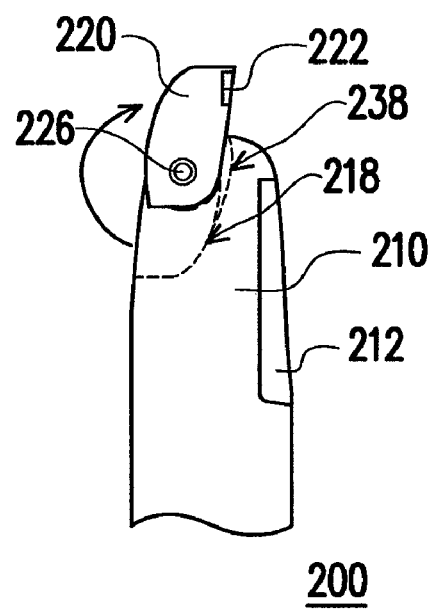

FIGS. 5 and 6 are side views showing a modification of the first embodiment of the present invention, in which when the second casing 220 is moved to the second position as shown in FIG. 6, the second casing 220 tightly abuts against an edge of a top wall of the first casing 210 so that a gap 240 between the first and second casings 210, 220 can be minimized to enhance the visual feeling of integrity of the handheld electronic device 200. In this modified embodiment, in order to enable the second casing 220 to move freely from the first position to the second position and vice versa, the hinge accommodating groove must be enlarged from the original position indicated by reference number 218 to a new position indicated by reference number 238.

In the first embodiment and its modification of the present invention, the display screen and the image-capturing apparatus are set up on the first casing and the second casing respectively. When the second casing is returned to the hinge-accommodating groove in the rear surface of the first casing, the display screen and the image-capturing apparatus face different directions as shown in FIG. 3 and FIG. 5. After rotating the second casing out of the hinge-accommodating groove in the first casing, both the display screen and the image-capturing apparatus face the same direction as shown in FIG. 4 and FIG. 6. Hence, images of the user himself (herself) or other people or objects can be readily captured by the image-capturing apparatus of the handheld electronic device of the present invention.

Figure 7A:
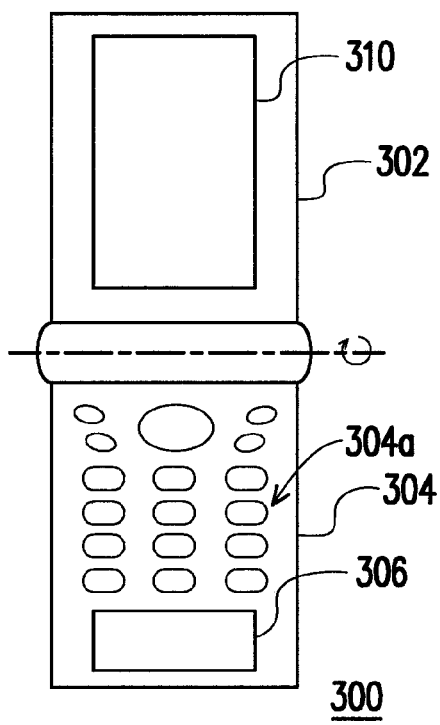
FIGS. 7A and 7B are front views showing opened and closed configurations of a handheld electronic device according to a second embodiment of the present invention.
Figure 7B:
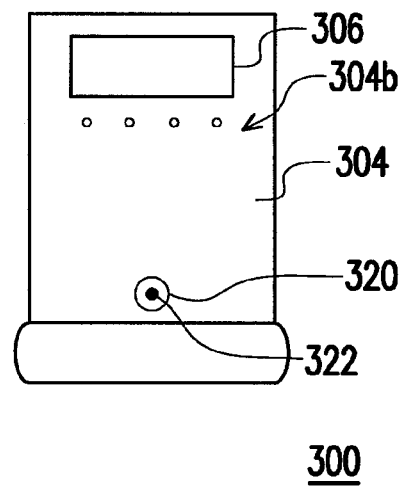
Figure 7C:
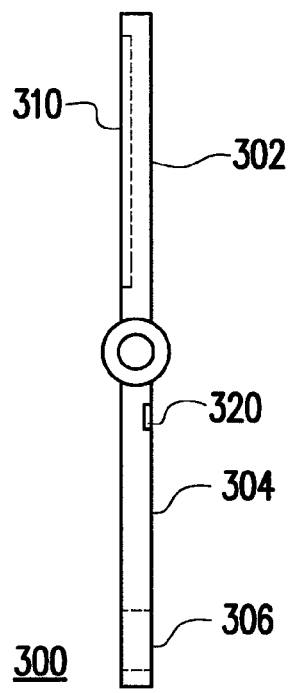
FIGS. 7C and 7D are side views of FIGS. 7A and 7B, respectively.
Figure 7D:
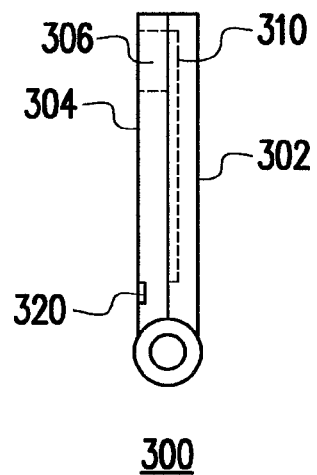

FIGS. 7A through 7D show the fold out and the fold in configuration of a handheld electronic device 300 according to a second embodiment of the present invention. As shown in FIGS. 7A through 7D, the handheld electronic device 300 has a display screen 310 and an image-capturing apparatus 320. The display screen 310 and the image-capturing apparatus 320 are set up on a first casing 302 and a second casing 304 respectively. The second casing 304 is pivoted to an edge of the first casing 302 via a hinge joint (not labeled). Furthermore, the second casing 304 covers the display screen 310 of the first casing 302 when the first casing 302 and the second casing 304 are folded to each other. It should be noted that the second casing 304 has a window 306 extending through inner surface 304a and outer surface 304b of the second casing 304. When the second casing 304 covers the display screen 310 of the first casing 302, a portion of the display screen 310 is exposed to outside via the window 306, as shown in FIGS. 7B and 7D. The second casing 304 has keys (not labeled) for inputting data and commands into the handheld electronic device 300.

The image-capturing apparatus 320 is set up on the outer surface 304b of the second casing 304. The image-capturing apparatus 320 mainly comprises a lens 322 and a photosensitive device (not shown) received in the second casing 304. Image of an object is received by the photosensitive device when the lens 322 is moved to aim at the object. When the second casing 304 is flipped away from the first casing 302, the display screen 310 and the image-capturing apparatus 320 each face a different direction as shown in FIGS. 7A and 7C. On the contrary, when the second casing 304 is on top of the first casing 302, both the display screen 310 and the image-capturing apparatus 320 face the same direction as shown in FIGS. 7B and 7D. Consequently, the handheld electronic device 300 is able to capture images of the user himself (herself) as well as any other persons or objects, by turning the image-capturing apparatus 310 to an appropriate direction. When the handheld electronic device 300 is used to capture the image of the user, the handheld electronic device 300 is at the fold in (closed) position of FIGS. 7B and 7D, and the image of the user on the display screen 310 can be seen by the user through the window 306. When the handheld electronic device 300 is used to capture the images of other persons or objects, the handheld electronic device 300 is at the fold out (opened) position of FIGS. 7A and 7D, and the images on the display screen 310 can be seen by the user directly.

Figure 8A:
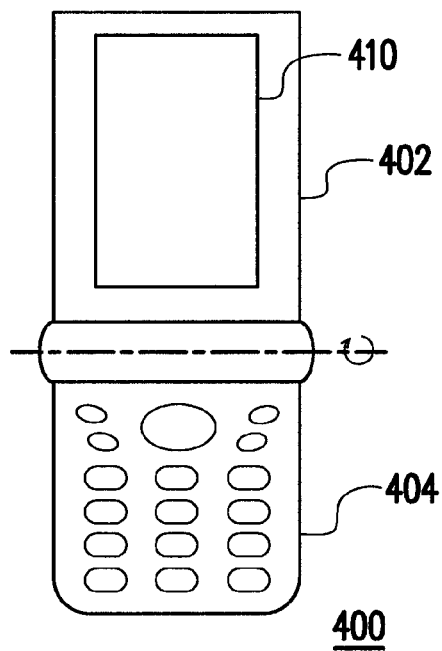
FIGS. 8A and 8B are front views showing opened and closed configurations of a handheld electronic device according to a third embodiment of the present invention.
Figure 8B:
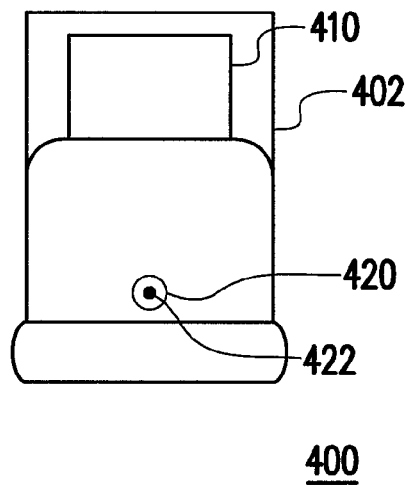
Figure 8C:
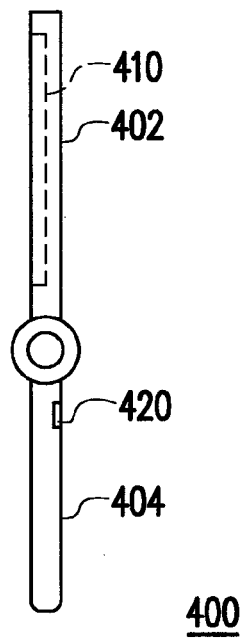
FIGS. 8C and 8D are side views of FIGS. 8A and 8B, respectively.
Figure 8D:
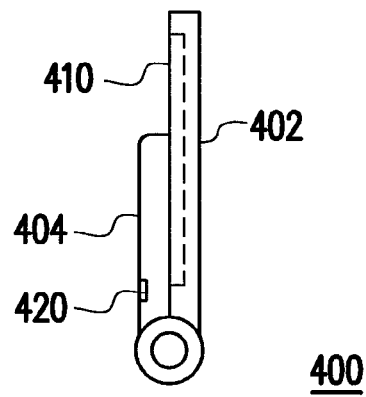
Figure 8E:
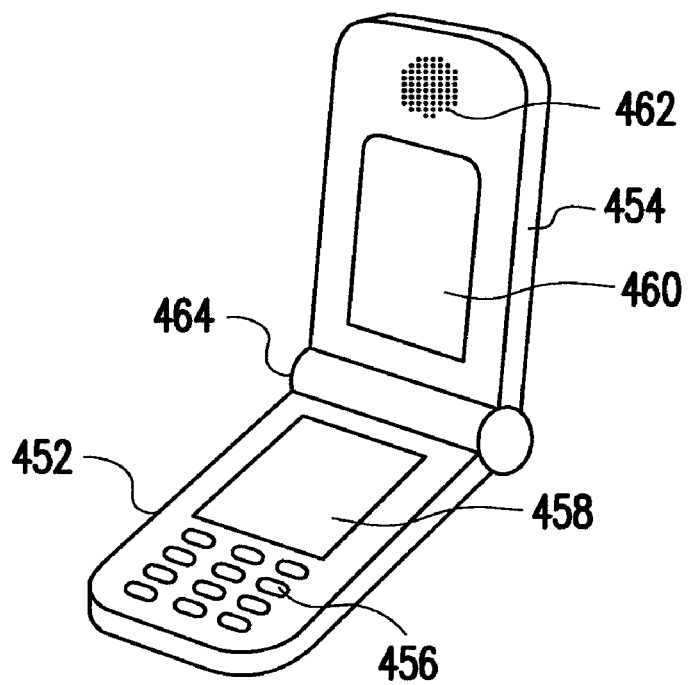
FIGS. 8E and 8F are perspective views showing opened and closed configurations of a handheld electronic device according to a fourth embodiment of the present invention.

FIGS. 8A through 8D show the fold out and the fold in configuration of a handheld electronic device 400 according to a third embodiment of the present invention. As shown in FIGS. 8A through 8D, the handheld electronic device 400 has a display screen 410 and an image-capturing apparatus 420. The display screen 410 and the image-capturing apparatus 420 are set up on a first casing 402 and a second casing 404 respectively. The second casing 404 is pivoted to an edge of the first casing 402 via a hinge joint (not labeled). Furthermore, the second casing 404 covers a portion of the display screen 410 of the first casing 402 when the first casing 402 and the second casing 404 are folded to each other. It should be noted that the second casing 404 does not cover the first casing 402 entirely but exposes a portion of the display screen 410 as shown in FIGS. 8B and 8D. The second casing 404 has a length shorter than that of the first casing 402. The image-capturing apparatus 420 mainly comprises a lens 422 and a photosensitive device (not shown) in the second casing 404. The second casing 404 has keys (not labeled) for inputting data and commands into the handheld electronic device 400.

Therefore, the image-capturing apparatus 402 of the handheld electronic device 400 can be used to capture images in different directions. Furthermore, even when the electronic device 400 is folded together, the second casing 404 will not prevent a user from observing a display image on the display screen 410. As shown in FIGS. 8A and 8C, the display screen 410 and the image-capturing apparatus 420 each faces a different direction when the handheld electronic device 420 is unfolded. The hinge joint is located between the display screen 410 and the image-capturing apparatus 420. Alternatively, both the display screen 410 and the image-capturing apparatus 420 face the same direction when the handheld electronic device 420 is folded, as shown in FIGS. 8B and 8D.

Figure 8F:
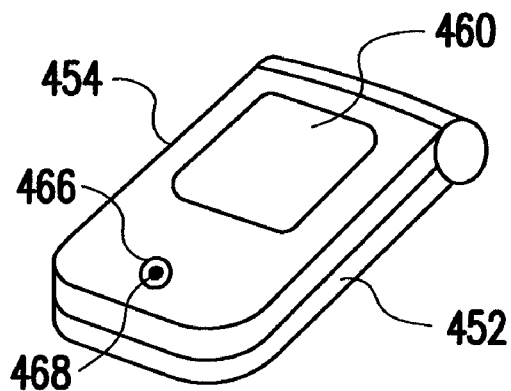

FIGS. 8E through 8J are diagrams showing various configurations of a handheld electronic device 450 according to a fourth embodiment of the present invention. The handheld electronic device 450 has a display screen 458 and an image-capturing apparatus 466. The display screen 458 and the image-capturing apparatus 466 are set up on a first casing 452 and a second casing 454 respectively. Furthermore, the second casing 454 is pivoted to an edge of the first casing 452 via a hinge joint 464 joining the first casing 452 and the second casing 454 together. After folding the first casing 452 and the second casing 454 together, the second casing 454 rests on top of the display screen 458 of the first casing 452. It should be noted that the second casing 452 has a window 460 through inner and outer surfaces of the second casing 454. The window 460 has a size substantially the same as that of the display screen 458. When the second casing 454 sits on top of the first casing 452, the window 460 exposes the entire display screen 458 as shown in FIGS. 8F, 8G and 8I. A speaker 462 is also installed on the second casing 454 above the window 460 to transmit acoustic information to the user. The first casing 452 has a set of keys 456 for inputting data and commands into the handheld electronic device 450.

The image-capturing apparatus 466 is set up on the outer surface of the second casing 454. The image-capturing apparatus 466 mainly comprises a lens 468 and a photosensitive device (not shown) in the second casing 454. When the second casing 454 is unfolded from the first casing 452, the display screen 458 and the image-capturing apparatus 466 each face a different direction as shown in FIGS. 8H and 8J, so that the image-capturing apparatus 466 can be used to capture images of persons or objects other than the user of the handheld electronic device 450. At this unfolded configuration of FIG. 8J, the hinge joint 464 is located between the display screen 458 and the image-capturing apparatus 466. Alternatively, when the second casing 454 and the first casing 452 are folded together, both the display screen 458 and the image-capturing apparatus 466 face the same direction as shown in FIGS. 8G and 8I. At this position, the handheld electronic device 450 is able to capture images of the user himself (herself). The images of the user on the display screen 458 can be seen by the user through the window 460.

FIGS. 9A and 9B are front and back views of a handheld electronic device 500 according to a fifth embodiment of the present invention. As shown in FIGS. 9A and 9B, the handheld electronic device 500 comprises a display screen 510 and an image-capturing apparatus 520. The display screen 510 and the image-capturing apparatus 520 are set up on a first casing 502 and a second casing 504 respectively. The second casing 504 is pivoted to an edge of the first casing 502 via a hinge joint (not labeled) so that the second casing 504 can rotate relative to the first casing 502. A plurality of keys (not labeled) for sending data and commands into the handheld electronic device 500 is set up on the second casing 504. It should be noted that the display screen 510 is positioned on a front surface 502a of the first casing 502. Furthermore, the first casing 502 has a window 506 extending through the front surface 502a and a back surface 502b of the first casing 502. The window 506 exposes the image-capturing apparatus 520 when the second casing 504 is flipped to abut against the back surface 502b of the first casing 502 (as shown in FIGS. 11 and 12).

FIG. 10 is a side view of the handheld electronic device 500 of FIG. 9A. FIGS. 11 and 12 are side view and front view of the handheld electronic device 500 of FIGS. 9A-B, 10 in a folded configuration. The image-capturing apparatus 520 mainly comprises a lens 522 and a photosensitive device (not shown) in the second casing 504. At the folded configuration of the handheld electronic device 500, images of the user of the device 500 can be received by the photosensitive device through the window 506 and the lens 522, and displayed on the display screen 510. Thus the user can readily use the handheld electronic device 500 as a digital camera to take his (her) own picture by himself (herself). At the folded configuration, the display screen 510 and the image-capturing apparatus 520 face the same direction. At the unfolded configuration of FIGS. 9A-B and 10, the display screen 510 and the image-capturing apparatus 520 face opposite directions, and the user can use the device 500 as a digital camera to take pictures of other persons or objects. At the unfolded configuration, the hinge joint is located between the display screen 510 and the image-capturing apparatus 520.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
a first casing having a front surface mounted with a display screen thereon;
a second casing pivoted to the first casing about a hinge section and movable between first and second positions relative to the first casing;
an image-capturing apparatus mounted on the second casing and spaced from the hinge section at a distance, wherein at the first position, the image-capturing apparatus faces a direction different from that of the display screen and the hinge section is located between the display screen and the image-capturing apparatus, and at the second position, the image capturing device faces a direction the same as that of the display screen and an image captured by the image-capturing apparatus is shown on the display screen and
a plurality of keys mounted on the second casing, wherein the keys and the image-capturing apparatus are mounted on opposite surfaces of the second casing respectively,
wherein the first casing comprises a window, and at the second position, a rear surface of the first casing is covered by the second casing, and the image-capturing apparatus is exposed through the window.

2. A handheld electronic device, comprising:
a first casing having a display screen thereon;
a second casing having an image-capturing apparatus mounted thereon, wherein the second casing is pivoted to the first casing and is flipped between first and second positions, wherein at the first position, the image-capturing apparatus faces a direction opposite to that of the display screen, and at the second position, the image capturing device faces a direction the same as that of the display screen; and
a plurality of keys mounted on the second casing, wherein the keys and the image-capturing apparatus are mounted on opposite surfaces of the second casing respectively,
wherein the first casing has a window, and at the second position, the image-capturing apparatus is exposed through the window.

* * * * *